(12) United States Patent
Chang

(10) Patent No.: US 6,402,113 B1
(45) Date of Patent: Jun. 11, 2002

(54) SAFETY HOOK ASSEMBLY

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/901,183

(22) Filed: Jul. 6, 2001

(51) Int. Cl.⁷ .................................................. B42F 13/00
(52) U.S. Cl. ..................... 248/340; 248/215; 248/302; 248/303
(58) Field of Search ............................. 248/340, 215, 248/301, 302, 303, 200, 175

(56) References Cited

U.S. PATENT DOCUMENTS

| | | | | | |
|---|---|---|---|---|---|
| 754,285 | A | * | 3/1904 | Dick | 248/302 |
| 1,477,702 | A | * | 12/1923 | Hall | 248/302 X |
| 3,749,346 | A | * | 7/1973 | Cherniak | 248/302 |
| 4,598,891 | A | * | 7/1986 | Harnert | 248/302 X |
| 4,672,703 | A | * | 6/1987 | Frazier | 248/302 X |

* cited by examiner

Primary Examiner—Ramon O. Ramirez

(57) ABSTRACT

A safety hook assembly has a main body having a first generally C-shaped portion, a second generally C-shaped portion, and a generally rhombic portion having a lower ring. The first generally, C-shaped portion has a first O-shaped winding portion and a first hook end. The second generally C-shaped portion has a second O-shaped winding portion and a second hook end. The first hook end of the first generally C-shaped portion is inserted in the second O-shaped winding portion of the second generally C-shaped portion. The second hook end of the second generally C-shaped portion is inserted in the first O-shaped winding portion of the first generally C-shaped portion. A first S-shaped hook is hooked on the lower ring of the main body. A second S-shaped hook is hooked on the lower ring of the main body.

1 Claim, 7 Drawing Sheets

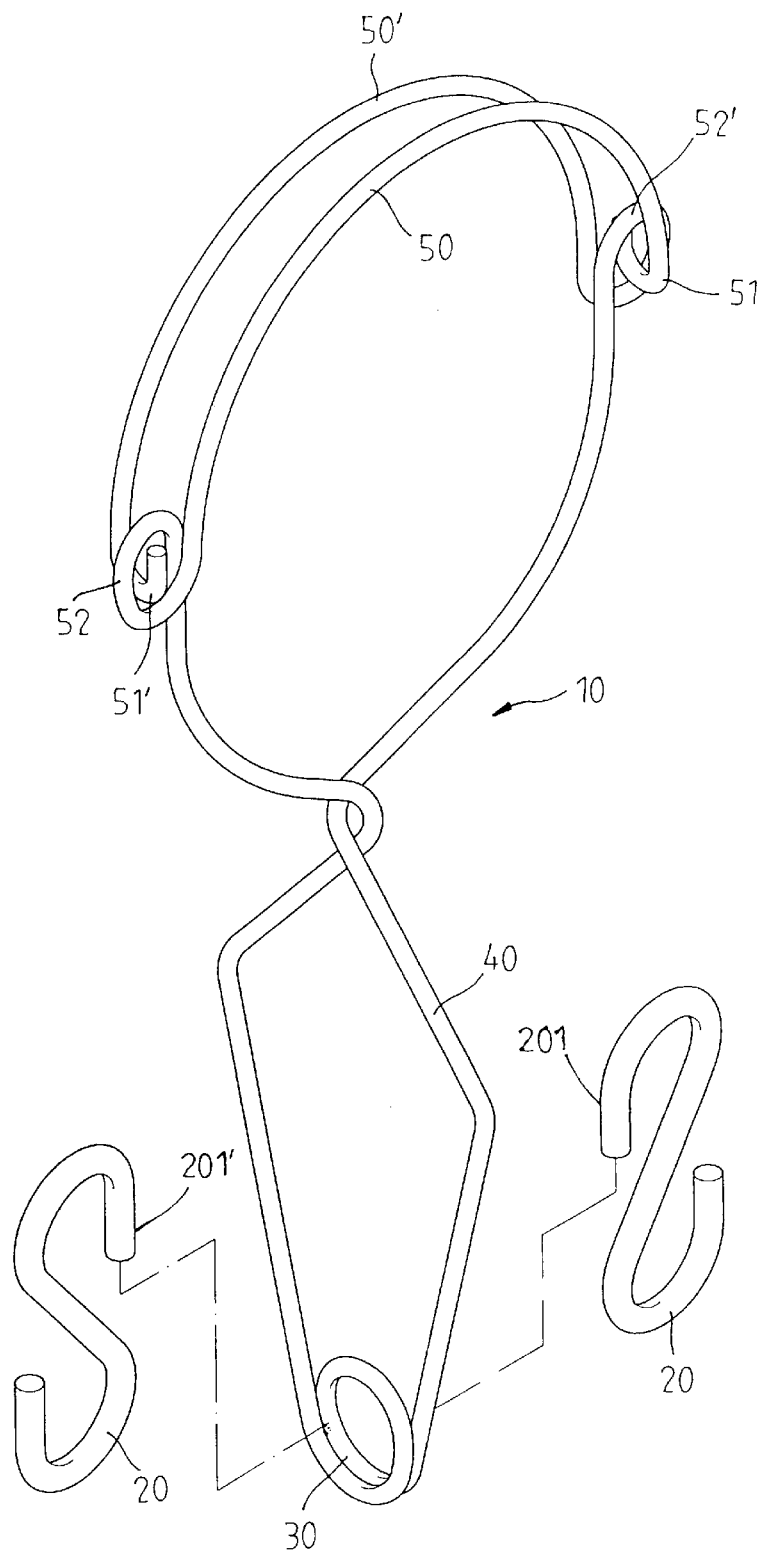
F I G. 1

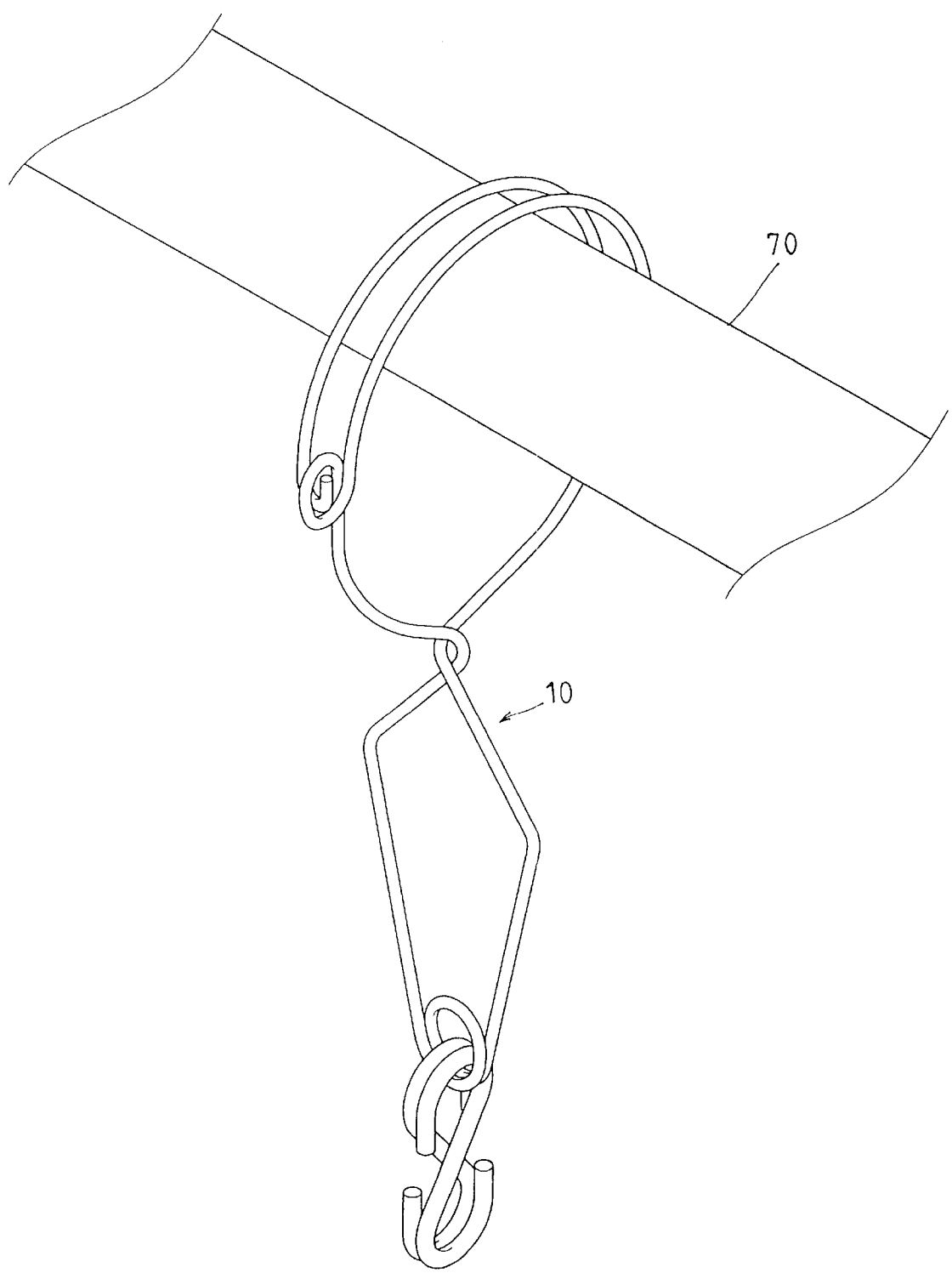
F I G. 6

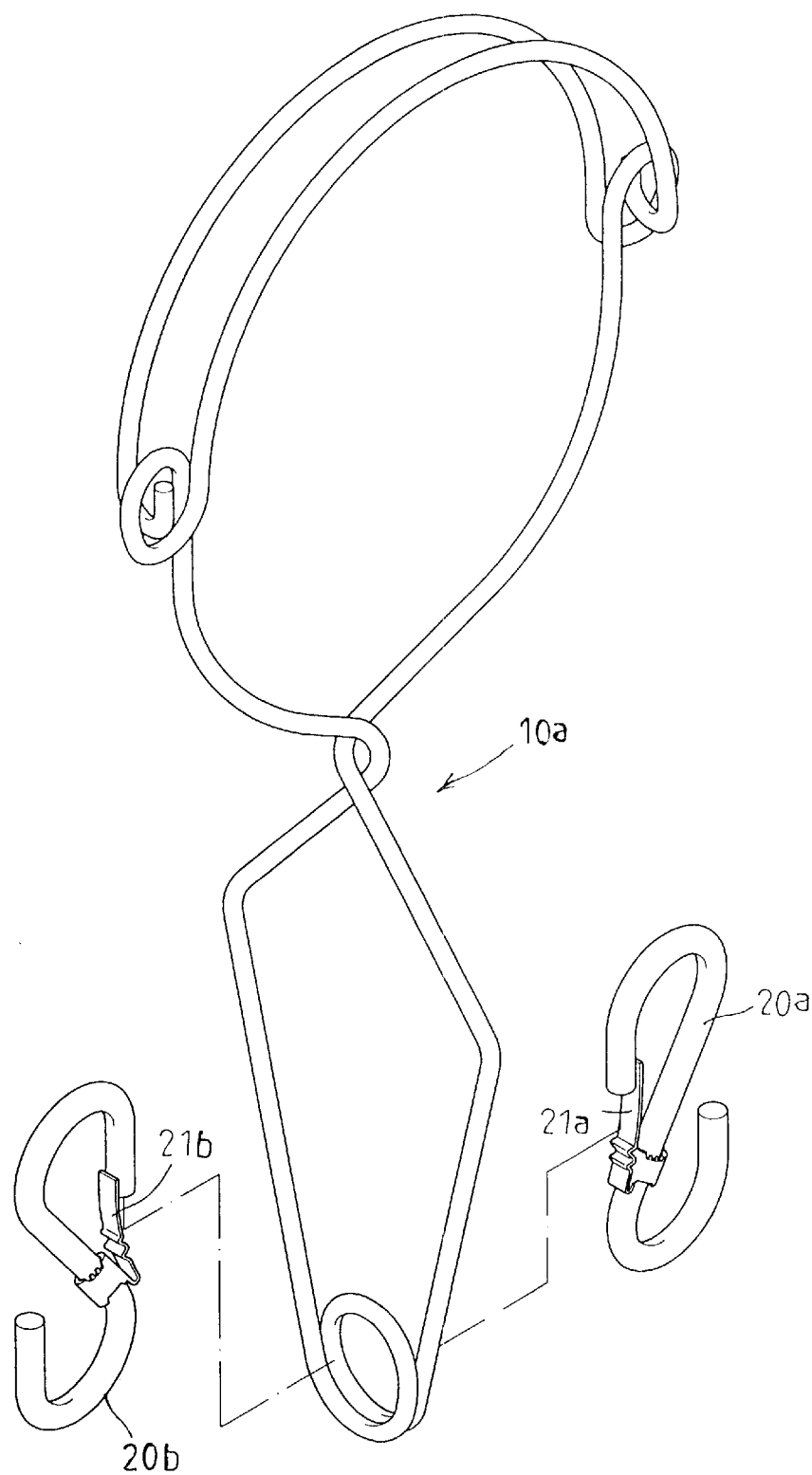
F I G. 7

SAFETY HOOK ASSEMBLY

BACKGROUND OF THE INVENTION

The present invention relates to a safety hook assembly. More particularly, the present invention relates to a safety hook assembly which can hook a heavy article safely.

A conventional safety hook is often soldered with a safety buckle. However, the conventional safety hook and the safety buckle are weakened by the heat treatment. Thus the conventional safety hook and the safety buckle will be broken while carrying a heavy article.

SUMMARY OF THE INVENTION

An object of the present invention is to provide a safety hook assembly which can hook a heavy article safely.

Accordingly, a safety hook assembly comprises a main body having a generally rhombic portion, a first generally C-shaped portion, a second generally C-shaped portion, and the generally rhombic portion having a lower ring. The first generally C-shaped portion has a first O-shaped winding portion and a first hook end. The second generally C-shaped portion has a second O-shaped winding portion and a second hook end. The first hook end of the first generally C-shaped portion is inserted in the second O-shaped winding portion of the second generally C-shaped portion. The second hook end of the second generally C-shaped portion is inserted in the first O-shaped winding portion of the first generally C-shaped portion. A first S-shaped hook has a first upper end hooked on the lower ring of the main body. A second S-shaped hook has a second upper end hooked on the lower ring of the main body.

BRIEF DESCRIPTION OF THE DRAWINGS

FIG. 1 is a perspective exploded view of a safety hook assembly of a preferred embodiment in accordance with the present invention;

FIG. 6 is a fourth schematic view illustrating a safety hook assembly of a preferred embodiment carrying a rod; and FIG. 7 is a perspective exploded view of a safety hook assembly of another preferred embodiment in accordance with the present invention.

DETAILED DESCRIPTION OF THE INVENTION

Figure 2:
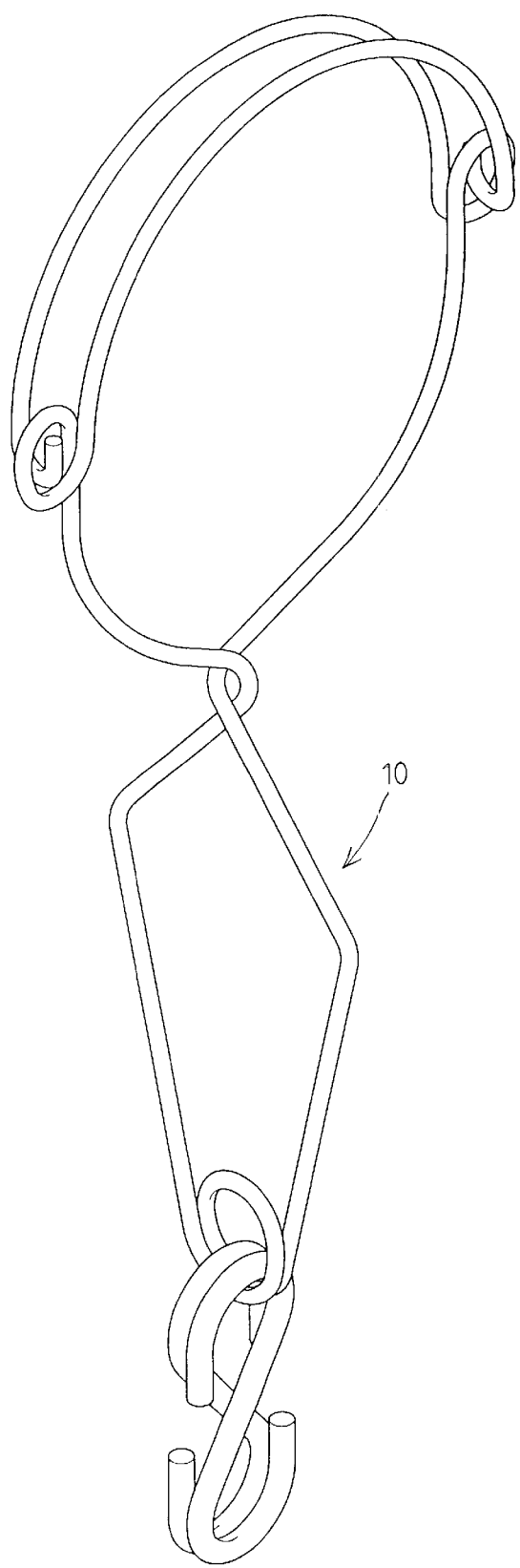
FIG. 2 is a perspective assembly view of a safety hook assembly of preferred embodiment in accordance with the present invention.

Referring to FIGS. 1 to 6, a safety hook assembly comprises a main body 10 having a generally rhombic portion 40, a first generally C-shaped portion 50, a second generally C-shaped portion 50', and the generally rhombic portion 40 having a lower ring 30.

The first generally C-shaped portion 50 has a first O-shaped winding portion 52 and a first hook end 51.

The second generally C-shaped portion 50' has a second O-shaped winding portion 52' and a second hook end 51'.

The first hook end 51 of the first generally C-shaped portion 50 is inserted in the second O-shaped winding portion 52' of the second generally C-shaped portion 50'.

The second hook end 51' of the second generally C-shaped portion 50' is inserted in the first O-shaped winding portion 52 of the first generally C-shaped portion 50.

A first S-shaped hook 20 has a first upper end 201 hooked on the lower ring 30 of the main body 10.

A second S-shaped hook 20' has a second upper end 201' hooked on the lower ring 30 of the main body 10.

Figure 3:
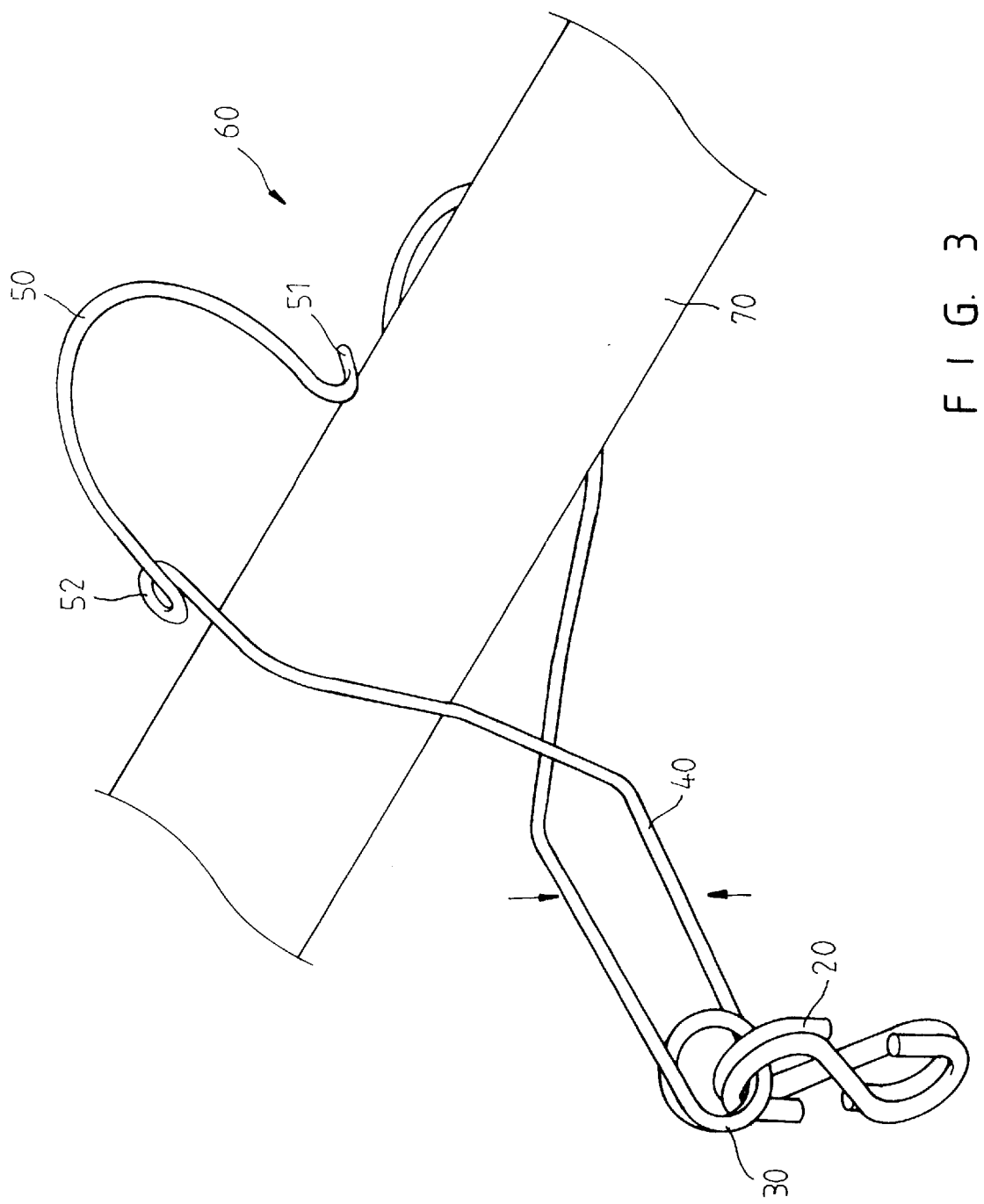
FIG. 3 is a first schematic view illustrating a safety hook assembly of a preferred embodiment carrying a rod.
Figure 4:
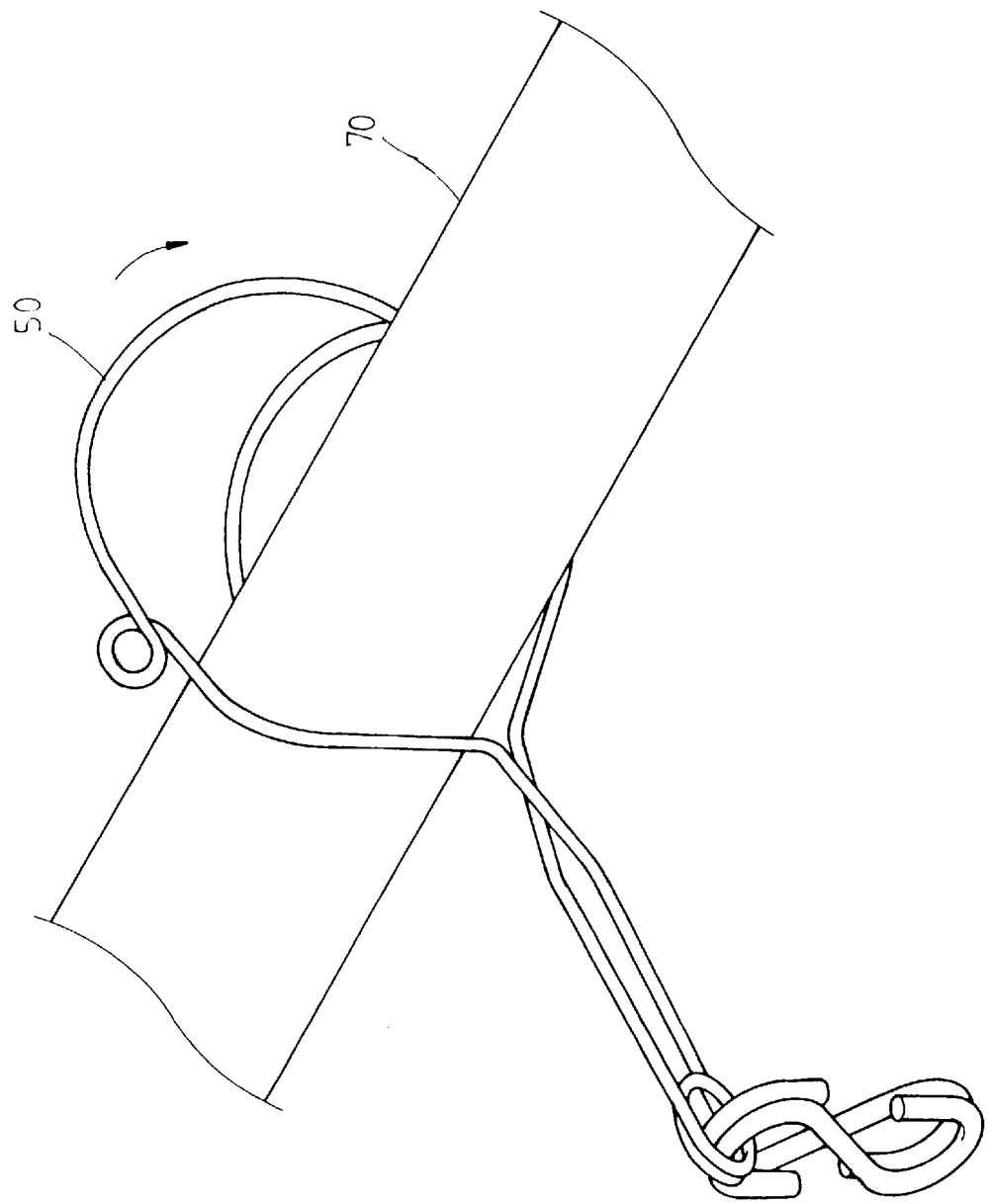
FIG. 4 is a second schematic view illustrating a safety hook assembly of a preferred embodiment carrying a rod.
Figure 5:
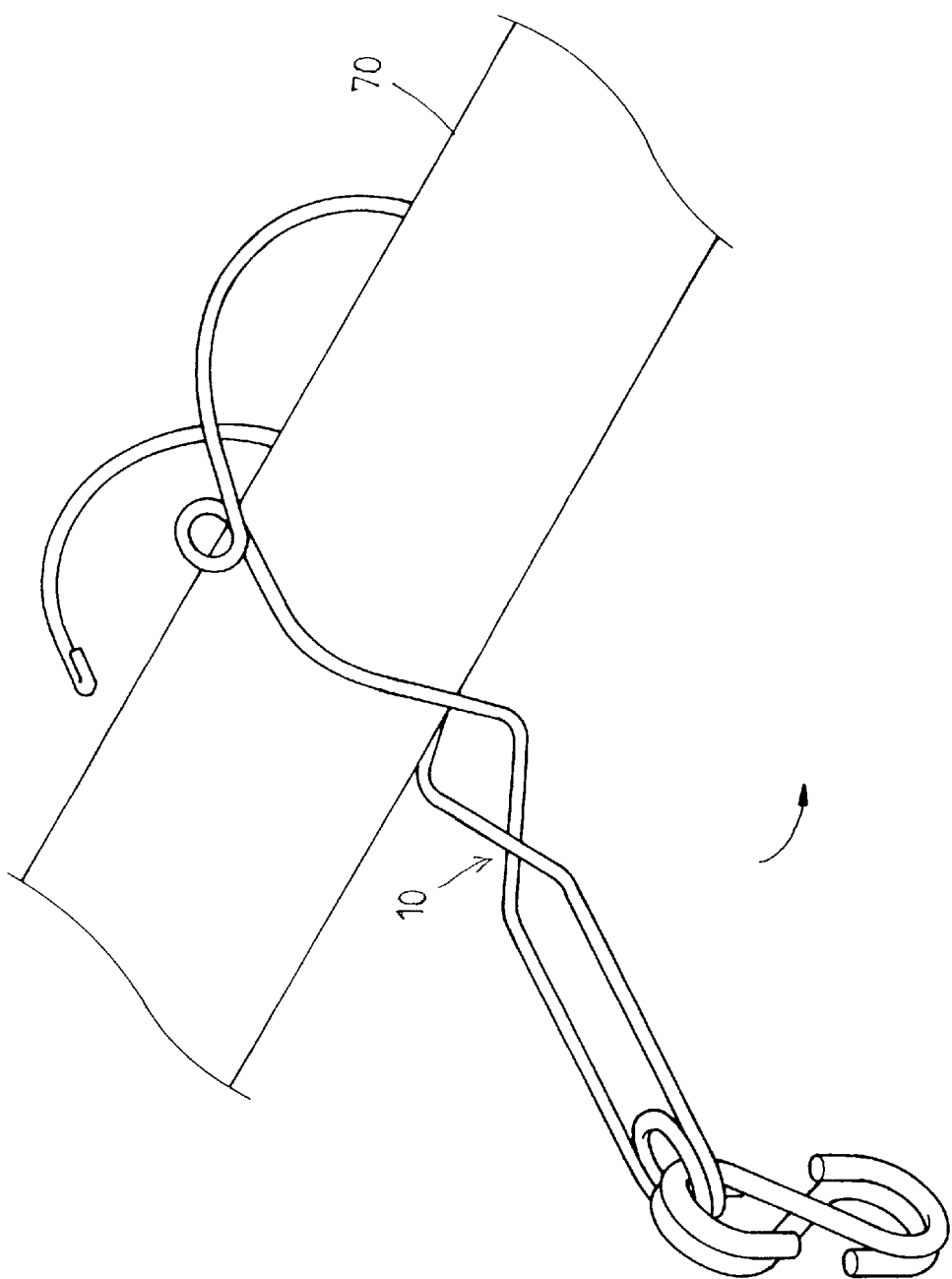
FIG. 5 is a third schematic view illustrating a safety hook assembly of a preferred embodiment carrying a rod.

Referring to FIGS. 3 to 5, the first hook end 51 of the first generally C-shaped portion 50 disengages from the second O-shaped winding portion 52' of the second generally C-shaped portion 50' and the second hook end 51' of the second generally C-shaped portion 50' disengages from the first O-shaped winding portion 52 of the first generally C-shaped portion 50 in order to form an opening 60. A rod 70 is inserted through the opening 60.

Then the first hook end 51 of the first generally C-shaped portion 50 is inserted in the second O-shaped winding portion 52' of the second generally C-shaped portion 50' and the second hook end 51' of the second generally C-shaped portion 50' is inserted in the first O-shaped winding portion 52 of the first generally C-shaped portion 50 again.

Referring to FIG. 7, another safety hook assembly comprises a main body 10a having a lower ring 30a, a first S-shaped hook 20 hooked on the lower ring 30a, and a second S-shaped hook 20 hooked on the lower ring 30a.

A first elastic clamp 21a is disposed on the first S-shaped hook 20a.

A second elastic clamp, 21b is disposed on the second S-shaped hook 20b.

Therefore, the safety hook assembly will hook a heavy article safely.

The present invention is not limited to the above embodiments but various modification thereof may be made. Furthermore, various changes in form and detail may be made without departing from the scope of the present invention.

I claim:

1. A safety hook assembly comprises:

a main body having a generally rhombic portion, a first generally C-shaped portion, a second generally C-shaped portion, and the generally rhombic portion having a lower ring, the first generally C-shaped portion having a first O-shaped winding portion and a first hook end, the second generally C-shaped portion having a second O-shaped winding portion and a second hook end, the first hook end of the first generally C-shaped portion inserted in the second O-shaped winding portion of the second generally C-shaped portion, the second hook end of the second generally C-shaped portion inserted in the first O-shaped winding portion of the first generally C-shaped portion, a first S-shaped hook having a first upper end hooked on the lower ring of the main body, and a second S-shaped hook having a second upper end hooked on the lower ring of-the main body.

* * * * *